(12) United States Patent
Wilkinson et al.

(10) Patent No.: US 6,690,444 B1
(45) Date of Patent: Feb. 10, 2004

(54) SEALING OF CELLS HAVING ACTIVE BACKPLANES

(75) Inventors: Timothy D Wilkinson, Cambridge (GB); William A Crossland, Cambridge (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 09/868,220

(22) PCT Filed: Dec. 16, 1999

(86) PCT No.: PCT/GB99/04276

§ 371 (c)(1),
(2), (4) Date: Aug. 1, 2001

(87) PCT Pub. No.: WO00/37998

PCT Pub. Date: Jun. 29, 2000

(30) Foreign Application Priority Data

Dec. 19, 1998 (GB) .............................. 9827965

(51) Int. Cl.[7] .................................. G02F 1/13
(52) U.S. Cl. ...................................... 349/153
(58) Field of Search ........................ 349/153

(56) References Cited

U.S. PATENT DOCUMENTS

| | | | | |
|---|---|---|---|---|
| 4,643,526 A | * | 2/1987 | Watanabe et al. ........... 349/151 |
| 4,682,858 A | * | 7/1987 | Kanbe et al. ................ 349/156 |
| 4,826,297 A | * | 5/1989 | Kubo et al. ................. 349/151 |
| 5,381,255 A | * | 1/1995 | Ohnuma et al. ............. 349/106 |
| 5,644,373 A | | 7/1997 | Furushima et al. |
| 6,151,091 A | * | 11/2000 | Muramatsu ................. 349/149 |
| 6,236,444 B1 | * | 5/2001 | Konuma et al. ............ 349/151 |
| 6,373,547 B2 | * | 4/2002 | Saito et al. ................. 349/155 |
| 6,486,936 B1 | * | 11/2002 | Sugimoto ................... 349/155 |

FOREIGN PATENT DOCUMENTS

| | | |
|---|---|---|
| EP | 0 593 266 | 4/1994 |
| EP | 0 603 420 | 6/1994 |

* cited by examiner

*Primary Examiner*—James Dudek
(74) *Attorney, Agent, or Firm*—Nixon & Vanderhye P.C.

(57) ABSTRACT

In active semiconductor backplane (3), for example for a smectic liquid crystal cell, which comprises an array of electronic or elctrical elements in a first region (4), logic elements for addressing said array in a second region spaced from the first, and conductors coupling said first and second regions, the first and second regions are sufficiently widely spaced (21, 22) (providing a "glue lane") to permit the presence of an adhesive sealing strip therebetween without substantial contact with the first and/or second regions, even when an opposed substrate is sealed thereto. The backplane may comprise spacers (25, 26) in the first region and/or glue lane.

15 Claims, 5 Drawing Sheets

SEALING OF CELLS HAVING ACTIVE BACKPLANES

This application is the U.S. national phase of International Application No. PCT/GB99/04276, filed Dec. 16, 1999, which designated the U.S., the entire content of which is hereby incorporated by reference.

BACKGROUND OF THE INVENTION

1. Field of the Invention

The present invention relates to active backplanes, and to the sealing of cells having active backplanes. It has special but not exclusive relevance to the assembly of light modulating cells comprising a light modulating material between the substrates.

2. Discussion of Prior Art

The device which is particularly described in this specification in connection with a preferred embodiment is a spatial light modulator in the form of a smectic liquid crystal layer disposed between an active semiconductor backplane and a common front electrode. It was developed in response to a requirement for a fast and, if possible, inexpensive, spatial light modulator comprising a relatively large number of pixels with potential application not only as a display device, but also for other forms of optical processing such as correlation and holographic switching. Our copending International Patent Applications of even filing and priority dates Applications (PCT/GB99/04285, U.S. Ser. No. 09/868,219, priority GB9827952.4; PCT/GB99/04286, U.S. Ser. No. 09/868,230, priority GB9827965.6; PCT/GB99/04282, U.S. Ser. Nos. 09/446,325 and 10/084,652, priority GB9827900.3; PCT/GB99/04279, U.S. Ser. No. 10/085,140, priority GB9827901.1; PCT/GB99/04274, U.S. Ser. Nos. 09/868,218 and 10/094,958, priority GB9827964.9; PCT/GB99/04275, U.S. Ser. No. 09/868,217, priority GB9827945.8; and PCT/GB99/04260 and PCT/GB99/04277, U.S. Ser. No. 09/868,241 and U.S. Ser. No. 09/868,242, both priority GB9827944.1) relate to other inventive aspects associated with the spatial light modulator.

During the course of development of the embodiment, a series of problems were encountered and dealt with, and the solutions to these problems (whether in the from of construction, function or method) are not necessarily restricted in application to the embodiment, but will find other uses. Thus not all of the aspects of the present invention are limited to liquid crystal devices, nor to spatial light modulators.

Nevertheless, it is useful to commence with a discussion of the problems encountered in developing the embodiment to be described later.

The liquid crystal phase has been recognised since the last century, and there were a few early attempts to utilise liquid crystal materials in light modulators, none of which gave rise to any significant successful commercial use. However, towards the end of the 1960's and in the 1970's, there was a renewed interest in the use of liquid crystal materials in light modulating, with increasing success as more materials, and purer materials became available, and as technology in general progressed.

Generally speaking, this latter period commenced with the use of nematic and cholesteric liquid crystal materials. Cholesteric liquid crystal materials found use as sensors, principally for measuring temperature or indicating a temperature change, but also for responding to, for example, the presence of impurities. In such cases, the pitch of the cholesteric helix is sensitive to the parameter to be sensed and correspondingly alters the wavelength at which there is selective reflection of one hand of circularly polarised light by the helix.

Attempts were also made to use cholesteric materials in electro-optic modulators, but during this period the main thrust of research in this area involved nematic materials. Initial devices used such effects as the nematic dynamic scattering effect, and increasingly sophisticated devices employing such properties as surface induced alignment, the effect on polarised light, and the co-orientation of elongate dye molecules or other elongate molecules/particles, came into being.

Some such devices used cells in which the nematic phase adopted a twisted (chiral) structure, either by suitably arranging surface alignments or by incorporating optically active materials in the liquid crystal phase. There is a sense in which such materials resemble cholesteric materials, which are often regarded as a special form of the nematic phase.

Initially, liquid crystal light modulators were in the form of a single cell comprising a layer of liquid crystal material sandwiched between opposed electrode bearing plates, at least one of the plates being transparent. The thickness of the liquid crystal layer in nematic cells is commonly around 20 to 100 microns.

At a later stage, electro-optic nematic devices comprising a plurality of pixels were being devised. Initially, these had the form of a common electrode on one side of a cell and a plurality of individually addressable passive electrodes on the other side of the cell (e.g. as in a seven-segment display), or, for higher numbers of pixels, intersecting passive electrode arrays on either side of the cell, for example row and column electrodes which were scanned. While the latter arrangements provided considerable versatility, there were problems associated with cross-talk between pixels.

The situation was exacerbated when analogue (grey scale) displays were required by analogue modulation of the applied voltage, since the optical response is non-linearly related to applied voltage. Addressing schemes became relatively complicated, particularly if dc balance was also required. Such considerations, in association with the relative slowness of switching of nematic cells, have made is difficult to provide real-time video images having a reasonable resolution.

Subsequently, active back-plane devices were produced. These comprise a back plane comprising a plurality of active elements, such as transistors, for energising corresponding pixels. Two common forms are thin film transistor on silica/glass backplanes, and semiconductor backplanes. The active elements can be arranged to exercise some form of memory function, in which case addressing of the active element can be accelerated compared to the time needed to address and switch the pixel, easing the problem of displaying at video frame rates.

Active backplanes are commonly provided in an arrangement very similar to a dynamic random access memory (DRAM) or a static random access memory (SRAM). At each one of a distributed array of addressable locations, a SRAM type active backplane comprises a memory cell including at least two coupled transistors arranged to have two stable states, so that the cell (and therefore the associated liquid crystal pixel) remains in the last switched state until a later addressing step alters its state. Each location electrically drives its associated liquid crystal pixel, and is bistable per se, i.e. without the pixel capacitance. Power to drive the pixel to maintain the existing switched state is obtained from busbars which also supply the array of SRAM locations. Addressing is normally performed from peripheral logic via orthogonal sets (for example column and row) addressing lines.

In a DRAM type active backplane, a single active element (transistor) is provided at each location, and forms, together with the capacitance of the associated liquid crystal pixel, a charge storage cell. Thus in this case, and unlike a SRAM backplane, the liquid crystal pixels are an integral part of the DRAM of the backplane. There is no bistability associated with the location unless the liquid crystal pixel itself is bistable, and this is not the case so far as nematic pixels are concerned. Instead, reliance is placed on the active element providing a high impedance when it is not being addressed to prevent leakage of charge from the capacitance, and on periodic refreshing of the DRAM location.

Thin film transistor (TFT) backplanes comprise an array of thin film transistors distributed on a substrate (commonly transparent) over what can be a considerable area, with peripheral logic circuits for addressing the transistors, thereby facilitating the provision of large area pixellated devices which can be directly viewed. Nevertheless, there are problems associated with the yields of the backplanes during manufacture, and the length of the addressing conductors has a slowing effect on the scanning. When provided on a transparent substrate, such as of glass, TFT arrays can actually be located on the front or rear surface of a liquid crystal display device.

In view of their overall size, the area of the TFT array occupied by the transistors, associated conductors and other electrical elements, e.g. capacitors is relatively insignificant. There is therefore no significant disadvantage in employing the SRAM configuration as opposed to the DRAM configuration. This sort of backplane thus overcomes many of the problems associated with slow switching times of liquid crystal pixels.

Generally, the active elements in TFT backplanes are diffusion transistors and the like as opposed to FETS, so that the associated impedances are relatively low and associated charge leakage relatively high in the "OFF" state.

Semiconductor active backplanes are limited in size to the size of semiconductor substrate available, and are not suited for direct viewing with no intervening optics. Nevertheless their very smallness aids speed of addressing of the active elements. This type of backplane commonly comprises FETs, for example MOSFETs or CMOS circuitry, with associated relatively high impedances and relatively low associated charge leakage in the "OFF" state.

However, the smallness also means that the area of the overall light modulation (array) area occupied by the transistors, associated conductors and other electrical elements, e.g. capacitors can be relatively significant, particularly in the SRAM type which requires many more elements than the DRAM type. Being opaque to visible light, a semiconductor backplane would provide the rear substrate of a light modulator or display device.

At a later period still, substantial development occurred in the use of smectic liquid crystals. These have potential advantages over nematic phases insofar as their switching speed is markedly greater, and with appropriate surface stabilisation the ferroelectric smectic C phases should provide devices having two stable alignment states, i.e. a memory function.

The thickness of the layer of liquid crystal material in such devices is commonly much smaller than in the corresponding nematic devices, normally being of the order of a few microns at most. In addition to altering the potential switching speed, this increases the unit capacitance of a pixel, easing the function of a DRAM active backplane in retaining a switched state at a pixel until the next address occurs.

However, as the thickness of the liquid crystal approaches the dimensions associated with the underlying structure of the backplane and/or the magnitude of any possible deformation of the liquid crystal cell structure by flexing or other movement of the substrates, problems arise, for example as to the uniformity of response across the pixel and the capability for short circuiting across the cell thickness. The alignment in chiral smectic liquid crystal cells is also frequently very sensitive to mechanical factors, and can be destroyed by mechanical impulses or shock.

Sealing of the Cell As indicated above, an active backplane comprises a display or light modulation area in which are distributed a plurality of locations each comprising at least one active element, together with peripheral logic for addressing the locations. Essentially, the only necessary connections between the logic and the locations are by addressing busbars such as column and row conductors, and, for SRAMS, power supply lines.

Externally, connections need to be made to the peripheral logic for data supply lines, power lines etc., and for this purpose an edge portion, or more likely at east two neighboring or opposed edge portions, of the active backplane is/are left projecting beyond the overlying transparent front electrode substrate.

It is necessary to seal a liquid crystal cell peripherally, for example with adhesive. In the case of a cell having an active semiconductor backplane, the two substrates are small, and it is not uncommon to find cells where the adhesive overlies at least a part of the peripheral logic and/or the edge of the area bearing the addressable locations, indicative of the difficulty which can be experienced in accurately locating the upper substrate relative to the lower substrate and controlling the flow of the adhesive. Thus there can be relatively little control over the exact location of the adhesive material in at least some instances.

Our copending application PCT/GB99/04286 (U.S. Ser. No. 09/868,230) relates to a method of assembling and sealing a first substrate to a second substrate in spaced opposed relation, the method comprising the steps of:

(a) providing a glue plate having an aperture having a shape corresponding to that of the first substrate but being of marginally smaller dimensions;

(b) covering the glue plate with adhesive;

(c) accurately bringing the first substrate into register with the aperture of the glue plate so that the peripheral region only of the first substrate is coated with adhesive; and (d) removing the first substrate from the plate and bringing it accurately into a desired register with the second substrate.

Preferably, at least one of the first and second substrates comprises electrical elements such as one or more conductors, or other passive or active electrical elements. Preferably at least one of the first and second substrates is transparent or translucent.

While the substrates may have identical areas, and be brought into complete register, the method covers instances where at least one edge of the second substrate projects beyond the first substrate, for example to facilitate electrical connection thereto.

In the device more particularly described hereafter, the second substrate is an active backplane, and the first (top) substrate provides a transparent counterelectrode and only extends as far as is necessary to seal the liquid crystal portion of the device, i.e. as defined by the array and a peripheral glue lane to be described later. All four peripheral regions of the backplane may project and thus be suitable for carrying pads for external electrical connections. Other circuitry of the backplane occupies these peripheral regions and so is also not covered or overlapped by the top substrate.

The top substrate is, transparent and carries on its underside a transparent electrode layer. A metal electrode, for example of aluminium, but more preferably copper, silver or gold, for connecting the transparent electrode layer to the backplane or elsewhere is formed on a side surface of the top substrate (e.g. by evaporating or sputtering), and extends around the corner to overlie and connect to the transparent electrode.

In a preferred form of the method, there is provided a jig having first and second cooperating portions for accurately locating the first and second substrates when they are brought into register during step (d).

In one form of the method, steps (a) to (c) comprise the step of positioning the first substrate on the first jig portion and the glue plate on the second jig portion so that the first substrate and the aperture of the glue plate can be brought accurately into the required register. Step (d) comprises replacing the glue plate on the second jig portion by the second substrate, and bringing the first and second substrates into the required register.

However, more preferably, the jig comprises a third portion functioning as or similarly to the second portion, steps (a) to (c) include the steps of positioning the first substrate on the first jig portion and the apertured plate on the third jig portion, so that the first substrate and the aperture can be brought accurately into the required register, and step (d) comprises placing the second substrate on the second jig portion for bringing the first and second substrates into the required register.

As particularly described below, the jig portions and the apertured glue plate may be arranged to permit assembly of a plurality of cells simultaneously. The first and second jig portions may respectively comprise first and second plates for mounting the first and second substrates at predetermined positions, together with locating means (for example including pins extending through holes in the plates) for ensuring that the first and second plates can be brought together in a desired relationship. Where provided, the third jig portion is similarly constructed, its plate being the glue plate. Where the third jig portion is not provided, the glue plate will be similarly located on locating means of the second jig portion.

Preferably, the adhesive is a UV setting adhesive. Although spacer elements may be provided within the glue bead itself, for example glass beads of a predetermined narrow size distribution, it is preferred to use glue without such elements and to rely on spacers already on place on one or both substrates. The provision of such spacers forms the subject of our copending application PCT/GB99/04282, U.S. Ser. No. 09/446,325.

Preferably, where the substrates comprise an active backplane and a transparent electrode, the first substrate is the transparent electrode. In such a case, it is preferred that the backplane projects beyond the transparent electrode on at least one side to facilitate electrical connections thereto.

Preferably the method is applied to the production of liquid crystal cells, and includes the step of inserting or placing liquid crystal material between the substrates. This can be performed prior to step (a), between steps (a) and (b), or after step (b). The last option is particularly suited to and/or preferred for the production of smectic liquid crystal cells and/or liquid crystal cells incorporating an active backplane.

Although spacing of the cell substrates within the area of the cell can be effected by including individual spacer elements distributed within the liquid crystal or other material within the cell itself, it is preferred to provide spacers located on, and distributed over, one or both substrates, as discussed in more detail in our copending application PCT/GB99/04282, U.S. Ser. No. 09/446,325.

While the assembly method is paticularly suited to constructions having semiconductor active backplanes, in view of the difficulty in accurately handling and locating them because of their size, other cell-like devices can be similarly assembled, including liquid crystal cells with TFT backplanes, other liquid crystal cells and other light modulators and displays.

Glue Lanes In much of the prior art it appears that little consideration has been given to the effect that a sealant between cell substrates may have on the operation or life of a cell, particularly where the sealant comes into contact with the active elements of the cell, whether the electronic components of the cell or its contents, for example liquid crystal material, as mentioned previously. Such contact may occur through inaccurate initial placement of the adhesive, misalignment of the substrates to be scaled, or by the sealant being squeezed during tile seating process.

European Patent Application No. 93916162.6 discloses a liquid crystal display device in which conductors which run between an array and external control circuitry, all on the same substrate are locally thickened to provide a spacing effect. Although there is no particular reference to the desirability of keeping the adhesive away from critical cell components, the showing in the figures would appear to indicate that in this particular case there is ample room in the conductor region to place an adhesive without any of the foregoing problems occurring, However, the device is described in terms of a thin film transistor array, and these are most commonly used in large scale display devices where there is plenty of room on the underlying substrate to provide for easy accommodation of an adhesive strip away from both the array and the control circuitry.

U.S. Pat. No. 5,644,373 (Furushima) also discloses a TFT device with an annular space between addressing circuitry and an array of TFTs; however, in this case the annular space is described merely as "a separating region" and is shown as being filled from side to side with adhesive, which thus contact both the array and the addressing circuitry.

By contrast, pat of the problem in scaling cells with active semiconductor backplanes resides in the closeness of the array of addressable locations to the peripheral logic, due to the smallness of the semiconductor area and the need to utilise it efficiently. In such a context, it is belied that there has been no previous recognition of the problems arising from contact between adhesive or sealant and critical cell components, and that the provision of a sufficiently broad dedicated "glue lane" for accommodating the sealant has not previously been disclosed or even suggested. By providing more space, it is possible to locate the peripheral glue strip essentially only over the addressing lines, or addressing and power lines, coupling the more densely occupied peripheral logic regions to the more densely occupied array region.

Reducing the amount of contact between the glue and functioning elements of the backplane is advantageous because the glue, or spacer elements distributed within the glue to space the substrates, can comprise electrically conductive impurities which will produce and electrical short across part of the cell or active backplane (the term "conductive" needs to be construed in context, insofar for example, the resistance of an FET in an active backplane is extremely high, and so needs only slight conductivity to be effectively shorted out).

SUMMARY OF THE INVENTION

The present invention provides semiconductor backplane comprising spaced first and second regions, an array of electronic or electrical elements in said first region, logic elements for addressing said array in said second region, and conductors coupling said first and second regions, characterized in that the first and second regions are sufficiently widely spaced to permit the presence of an adhesive sealing strip therebetween without substantial contact with the first and second regions. In practice, the minimum useful width of adhesive that can be applied is around 300 microns, so that allowing for tolerances in relative positioning, the width of the glue lane should be at least 500 microns, more preferably at least 1000 micons, and even more preferably 1500 microns.

BRIEF DESCRIPTION OF THE DRAWINGS

Further features and advantages of the invention can be derived from a consideration of the appended claims, to which the reader is referred, and of the following description of an embodiment of the invention made with reference to the accompanying drawings, in which:

FIG. 1 shows in schematic cross-sectional view a liquid crystal cell 1 mounted on a thick film alumina hybrid substrate or chip carrier 2. The cell 1 is shown in exploded view in FIG. 2. The use of a hybrid substrate for mounting electro-optic devices is discussed in more detail in our copending application PCT/GB99/04285, U.S. Ser. No. 09/868,219.

Cell 1 comprises an active silicon backplane 3 in which a central region is formed to provide an array 4 of active mirror pixel elements arranged in 320 columns and 240 rows. Outside the array, but spaced from the edges of the backplane 3, is a peripheral glue seal 5, which seals the backplane 3 to the peripheral region of a front electrode 6. FIG. 2 shows that the glue seal is broken to permit insertion of the liquid crystal material into the assembled cell, after which the seal is completed, either by more of the same glue, or by any other suitable material or means known per se.

Figure 1:
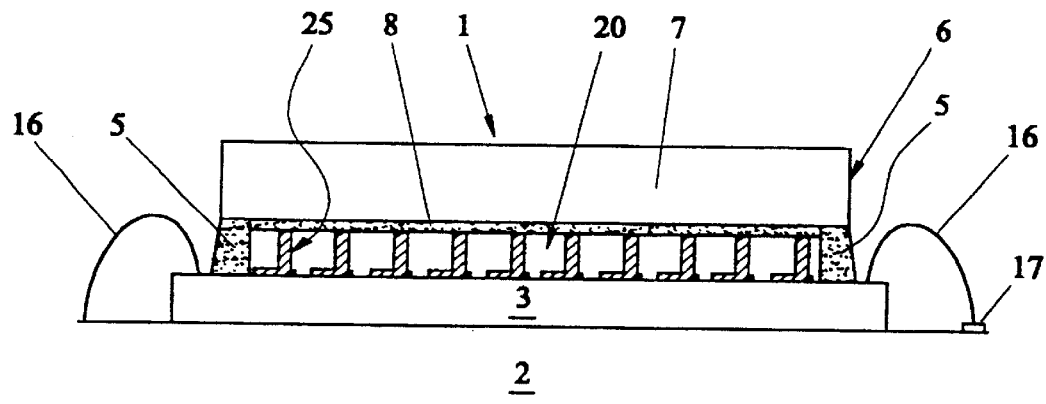
FIG. 1 shows in schematic cross-sectional view a liquid crystal cell which incorporates an active backplane and is mounted on a substrate.

Front electrode 6 comprises a generally rectangular planar glass or silica substrate 7 coated on its underside, facing the backplane 3, with a continuous electrically conducting silk screened indium-tin oxide layer 8. On one edge side of the substrate 7 is provided an evaporated aluminium edge contact 9, which extends round the edge of the substrate and over a portion of the layer 8, thereby providing an electrical connection to the layer 8 in the assembled cell 1.

Insulating spacers 25 formed on the silicon substrate of the backplane 3 extend upwards to locate the front electrode 6 a predetermined, precise and stable distance from the silicon substrate, and liquid crystal material fills the space so defined. The spacers 25 and the backplane 3 are formed on the silicon substrate simultaneously with formation of the elements of the active backplane thereon, using all or at least some of the same steps (see later, and also our copending application (U.S. Ser. No. 09/446,325).

Figure 3:
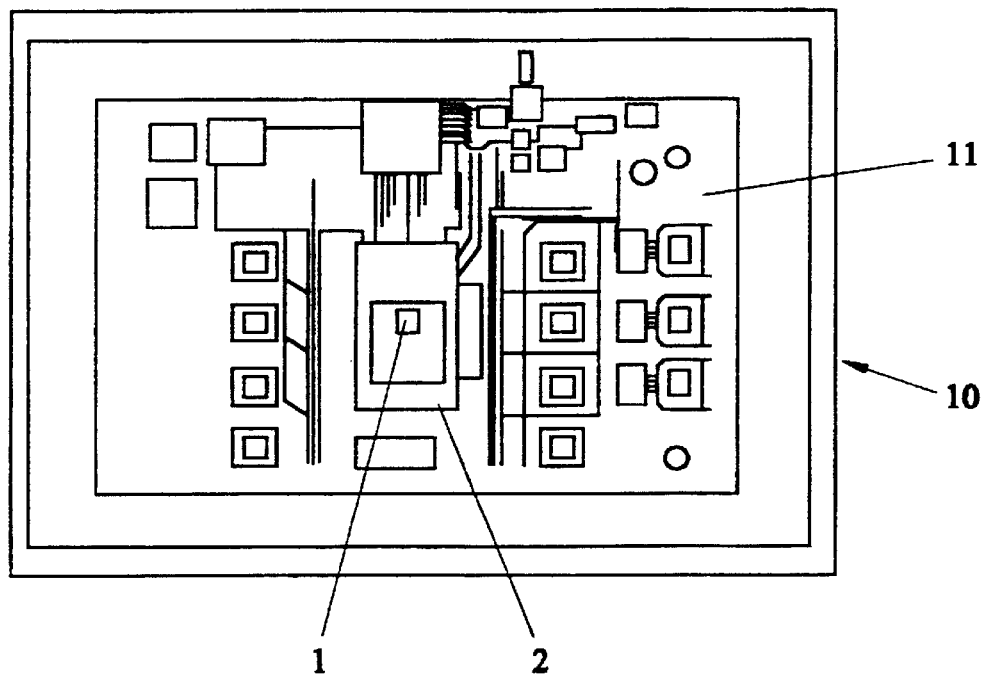
FIG. 3 is a general plan view of an electro-optic interface comprising the liquid crystal cell of FIG. 1.
Figure 4:
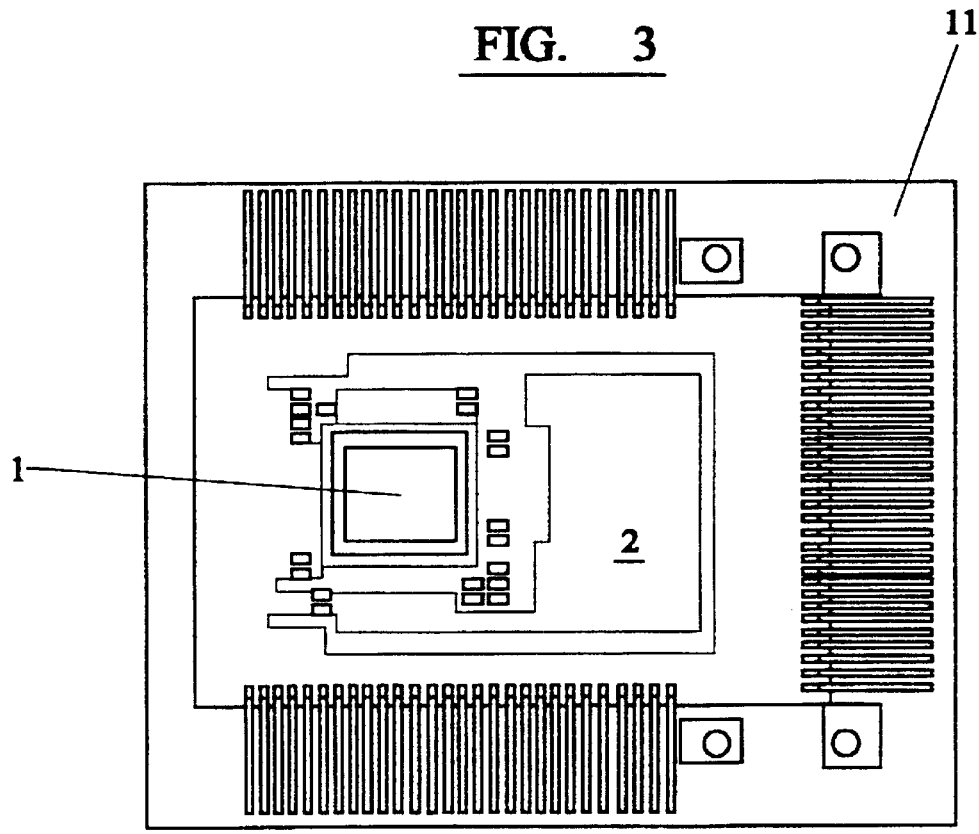
FIG. 4 is a closer view of the part of the interface of FIG. 3 illustrating the mounting of the liquid crystal cell of FIG. 1 via a hybrid substrate on a printed circuit board.

As shown in FIG. 3, the cell 1 forms part of an electro-optic interface 10 comprising a surface mounting printed circuit board (PCB) 11 on which is located the thick film alumina hybrid substrate or chip carrier 2, on which in turn is mounted the cell 1. FIG. 4 shows a closer view of the substrate 2 together with the adjacent portion of the PCB 11.

Figure 5:
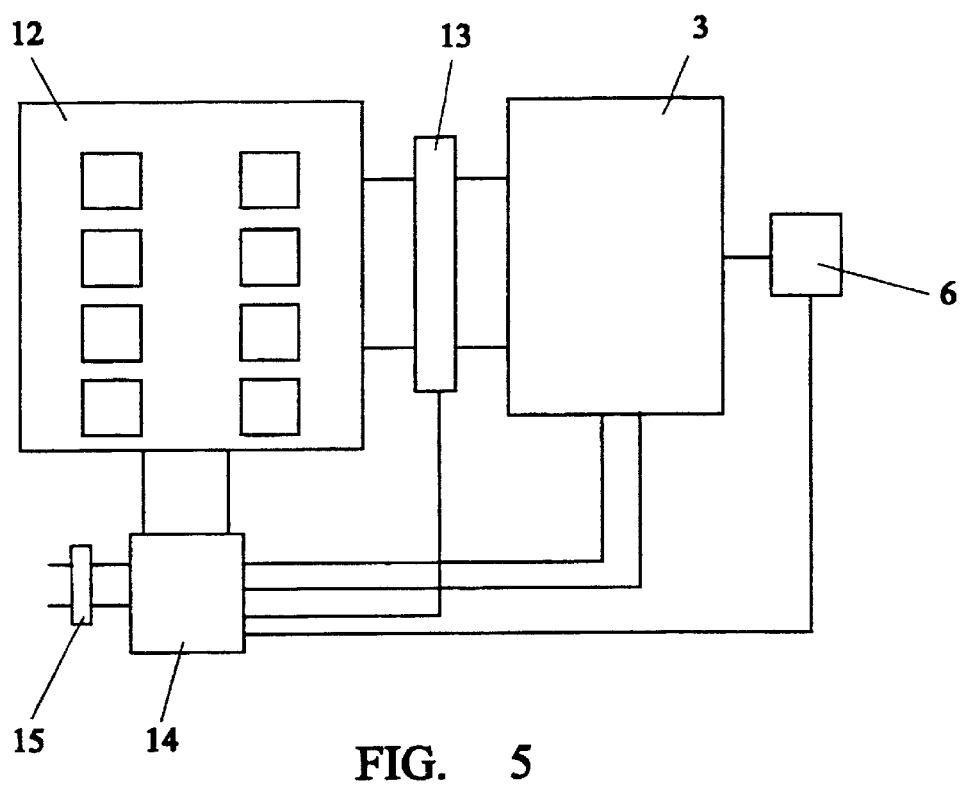
FIG. 5 is a schematic block circuit diagram of part of the interface of FIG. 3 showing circuitry closely associated with the liquid crystal cell.

FIG. 5 is a schematic outline of circuitry on the PCB 11 closely associated with operation of the cell 1, here shown schematically as backplane 3 and from electrode 6. Backplane 3 receives data from a memory 12 via an interface 13, and all of the backplane 3, front electrode 6, memory 12 and interface 13 are under the control of a programmable logic module 14 which is itself coupled to the parallel port of a PC via an interface 15.

In a preferred method of assembly, a wafer comprising a plurality of identical active backplanes 3 is diced, and a front electrode 6 is glued and sealed 5 to a die to provide an empty cell a process illustrated in part in FIG. 7 to be described later.

Only subsequent to assembly of the front electrode is the die probed to confirm that it functions correctly, thereby avoiding the riskier procedure of an initial probing step on t he wafer itself. That this can be done with no economic or time loss is at least partly due to the high yield of workable backplanes on the wafer.

After probing, an empty cell with functioning backplane is secured to the hybrid substrate 2 by epoxy and wire bonded 16 to wire bonding pads 17 on the substrate 2. Other circuit components 18 are also surface mounted and electrically connected to conductive tracks on the substrate 2. The latter tracks are part of a pattern of tracks provided on the substrate 2 in a desired configuration, for extending between the wire bonding pads 16 for the backplane, the other components 18, and means for connecting the substrate to the PCB 11—as shown in FIG. 4 such means are in the form of edge pads 19, but any suitable means known per se can be used.

Preferably only after the empty cell has been secured and bonded to the hybrid substrate 2 is it filled; with a selected smectic liquid crystal material 20.

In a preferred method of assembly, the following steps are performed, starting from the processed silicon wafer and the glass substrate of the front electrode through to the assembled liquid crystal cell on the substrate.

The processed wafer is tested at a probe station, coated with a photoresist layer (planarisation), and diced with a wafer saw. After the glass substrate of the front electrode is cut, cleaned and provided with the indium tin oxide layer 8, the edge contact 9 of aluminium is evaporated thereon. Alignment layers of rubbed polyamide are then provided on both the diced wafer (die) and the front electrode 6, and the glue seal S is printed onto the front electrode prior to assembly as an unfilled cell. A preferred method of assembly of the die and front electrode is described in greater detail elsewhere in this specification. The unfilled cell is then adhered to the hybrid substrate 2, after which it is filled with a liquid crystal material 20.

Figure 6:
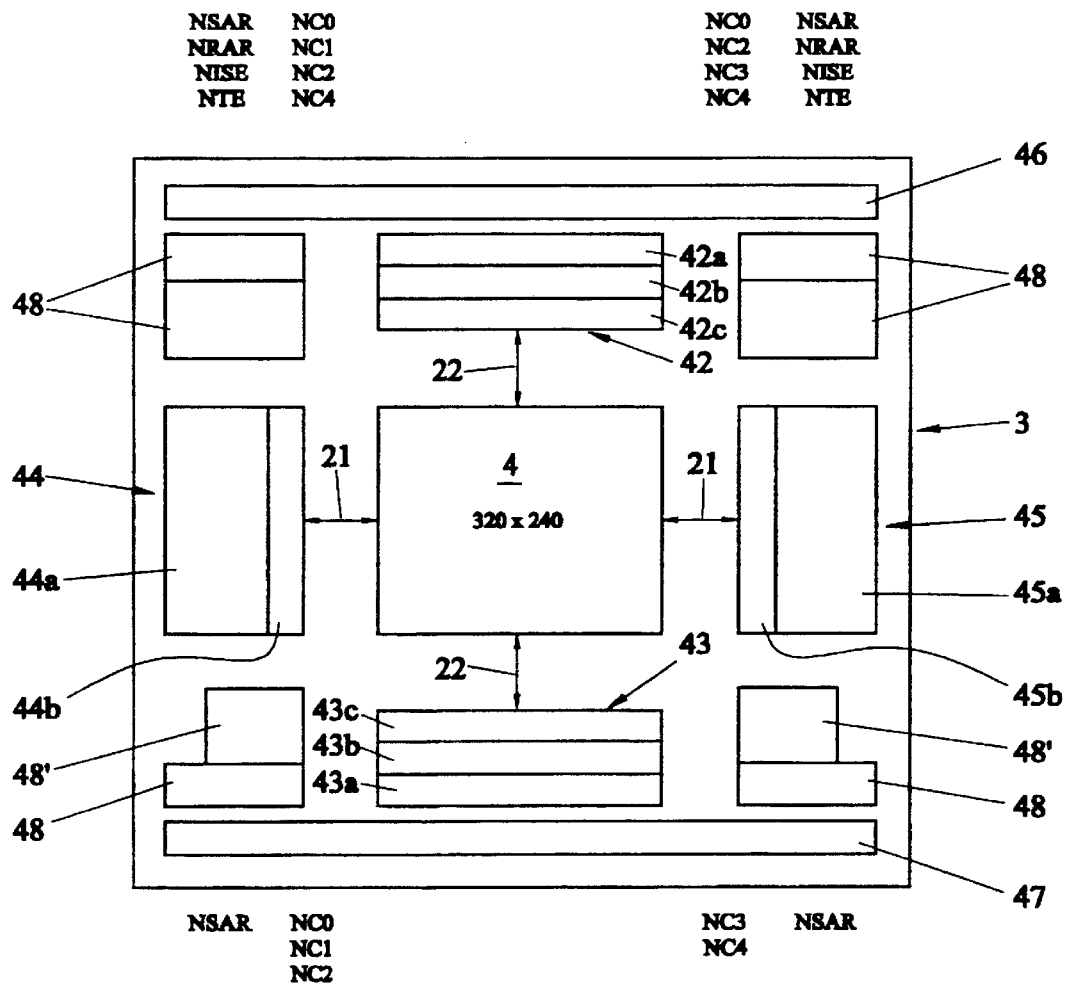
FIG. 6 is a schematic plan view (floorplan) of the active backplane of the liquid crystal cell of FIG. 1, including a central pixel array.

FIG. 6 shows a general schematic view of the layout ("floorplan") of the active backplane 3. Each one of the central array 4 of pixel active elements is composed essentially of an NMOS transistor having a gate connected to one of a set of a row conductors, a drain electrode connected to one of a set of column conductors and a source electrode or region which either is in the form of a mirror electrode or is connected to a mirror electrode. Together with an opposed portion of the common front electrode 6 and interposed chiral smectic liquid crystal material 20, the rear located mirror electrode forms a liquid crystal pixel cell which has capacitive characteristics.

Even and odd row conductors are connected to respective scanners 44, 45 spaced either side of the array. Each scanner comprises a level shifter 44b, 45b interposed between a shift register 44a, 45a and the array. In use, a token signal is passed along the registers to enable (render the associated transistors conductive) individual rows in turn, and by suitable control of the registers different types of scan, e.g. interlaced or non-interlaced, can be performed as desired.

Even and odd column conductors are connected to respective drivers 42, 43 spaced from the top and bottom of the array. Each driver comprises a 32 to 160 demultiplexer 42a, 43a feeding latches 42b, 43b, and a level shifter 42c, 43c between the latches and the column conductors. In use, under the control of a 5-phase clock, data from the memory 24 for successive sets of 32 odd or even column conductors is passed from sets of edge bonding pads 46, 47 to the demultiplexers 42a, 43a, and latched at 42b, 43b before being level shifted at 42c, 43c for supply as a driving voltage to the column conductors. Synchronisation between the row scanning and column driving ensures that the appropriate data driving voltage is applied via the enabled transistors of a row to the liquid crystal pixels, and for this purpose various control circuits 48 and test circuits 48' are provided.

Subsequent disabling of that row places the transistors in a high impedance state so that charges corresponding to the data are then maintained on the capacitive liquid crystal pixels for an extended period, until the row is again addressed.

The gaps 21 between the level shifters 44b, 45b and the adjacent edges of the array 4 are 1 mm wide, and the gaps 22 between the level shifters 44b, 45b and the adjacent edges of the array 4 are 2 mm wide. These gaps, or glue lanes, are sufficiently large to completely accommodate a glue seal 5 of approximate width of 300 microns while allowing for tolerances in positioning of the seal. As shown in FIG. 1, the size of the front electrode 6 sufficient to cover only the array and most of the glue lanes. In the embodiment the array is 11 mm by 8 mm, and the front electrode is 12.4 mm by 9.4 mm.

Figure 7:
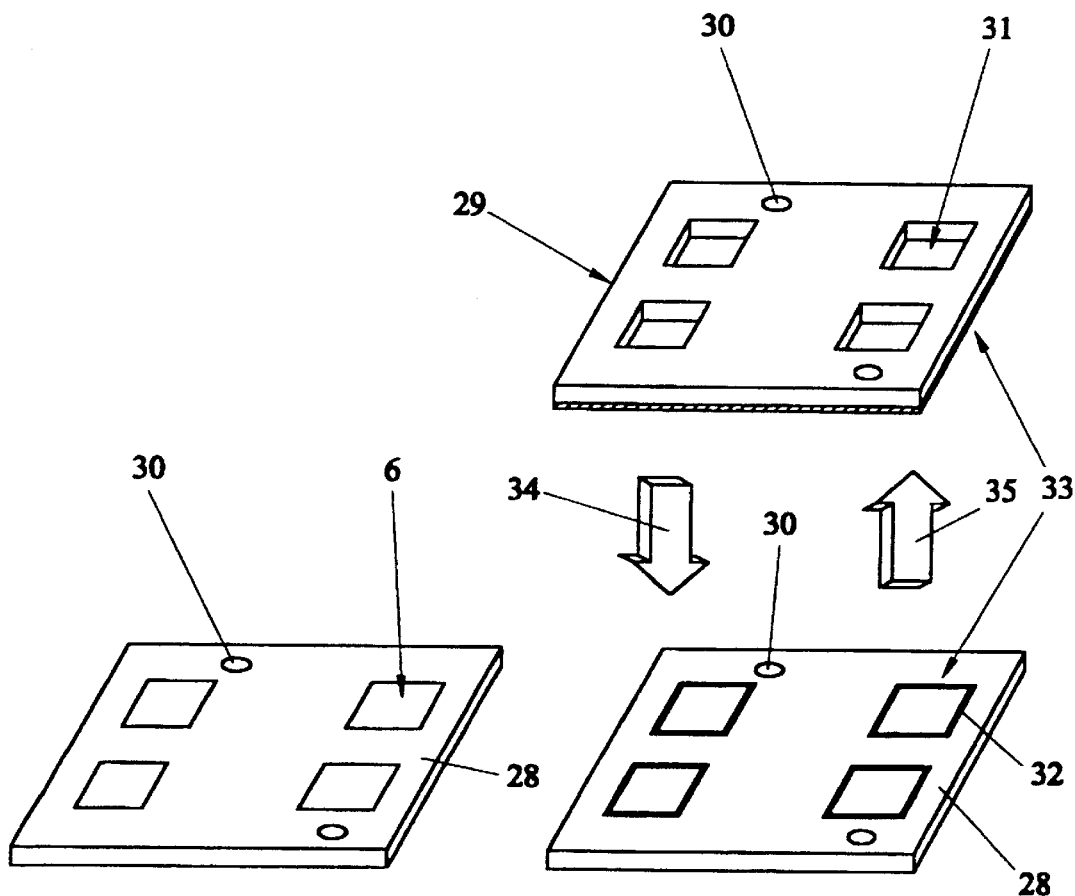
FIG. 7 is illustrative of the use of jigs in assembling the cell of FIG. 1.

The left hand side of FIG. 7 illustrates a plate 28 of a first portion of a jig, on which plate are mounted four front electrodes 6 at predetermined location by means known per se. The plate has two apertures for cooperation with aligning pins of the jig. On the right hand side of FIG. 7 is shown a glue plate 29 of a third portion of the jig which is provided with two apertures 30 corresponding in size and location to the apertures 30 of the plate 28. Plate 29 is further provided with four apertures 31, each marginally smaller (11.6 by 8.6 mm) than the corresponding front electrode 6 and centrally registered therewith when the two plates are superposed with their apertures 30 aligned as shown.

One surface of plate 29, the lower surface as shown, is coated with adhesive 33, for example by screen printing, the plate is then brought down towards the plate 28 and into contact with the front electrodes thereon, in the direction of arrow 34. Subsequently plate 29 is raised in the direction of arrow 35, leaving the peripheral regions 32 of the front electrodes 6 coated with adhesive.

By means known per se, the substrates 3 are also mounted in predetermined locations on a plate (not shown) of a second portion of a jig, similar in construction to the plate 28. This plate and plate 28, still bearing the glue imprinted front electrodes are then brought into register using the aligning apertures 30 so that the peripheral region of the front electrode 6 bearing the adhesive overlies and falls within the glue lanes 21, 22.

One of the first and second parts of the jig can then be removed if desired (at least one being retained to maintain alignment of the assembled front electrode and backplane), and sufficient pressure is applied to the assembly to ensure sealing of front electrode to the backplane prior to UV curing of the adhesive.

Figure 2:
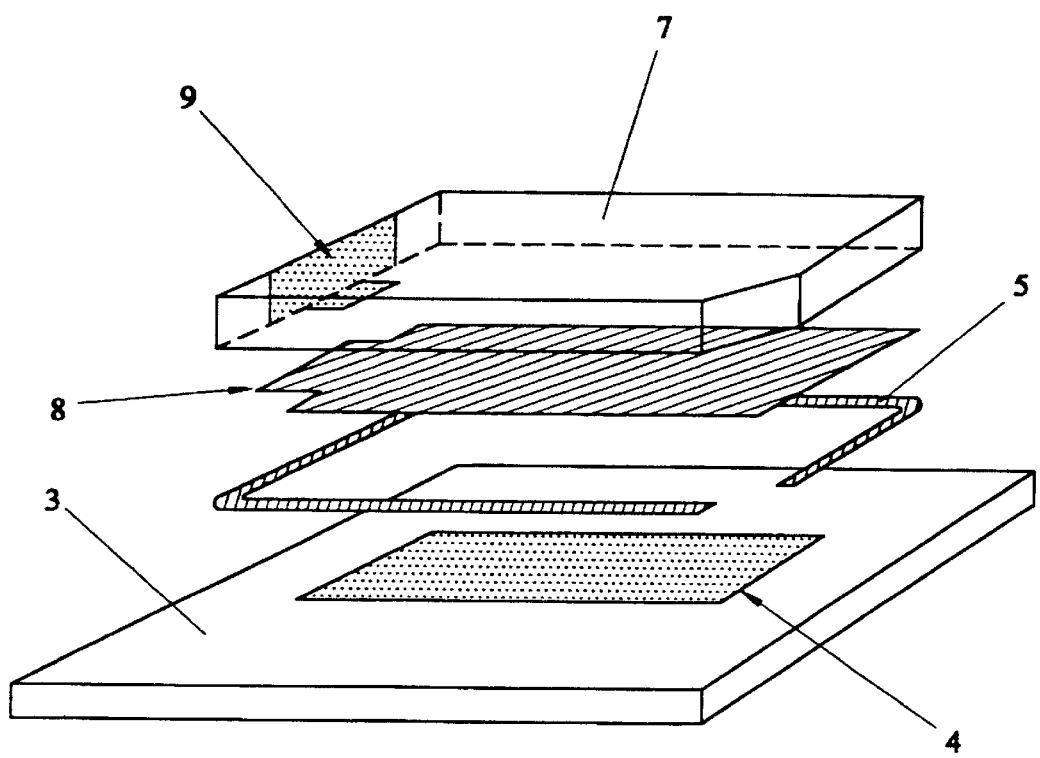
FIG. 2 is an exploded view of components of the liquid crystal cell of FIG. 1.

Although the process has been described for a continuous glue seal, it should be clear that a break, for example in the location shown in FIG. 2, can be produced by locally enlarging the corresponding apertures 32 of the plate 29.

Figure 8:
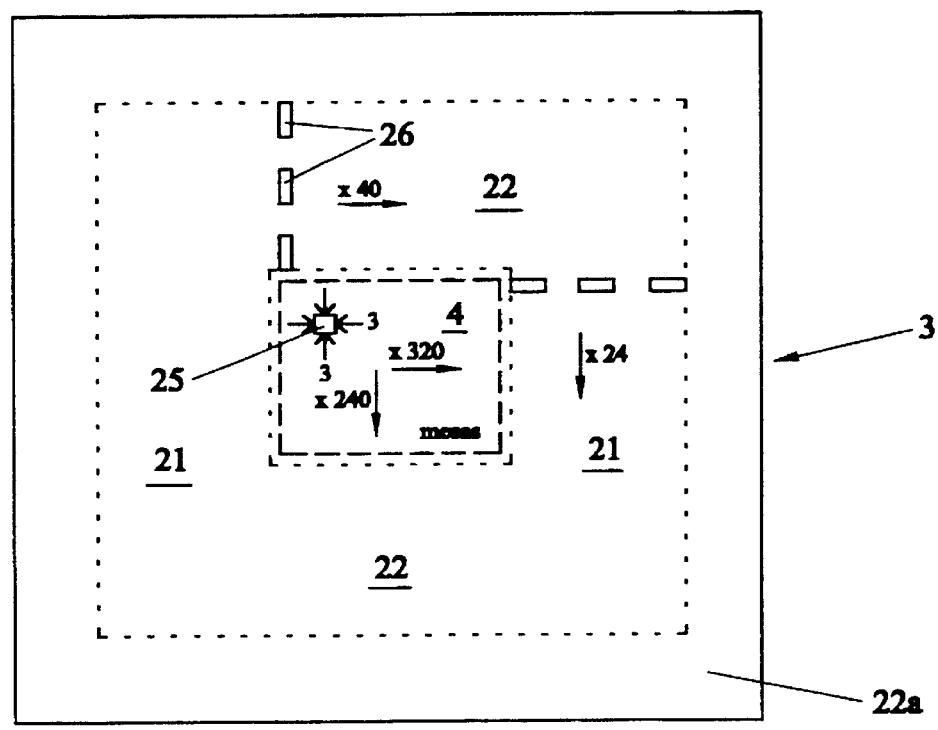
FIG. 8 is a schematic plan view of the central part of the backplane of FIG. 6 to illustrate to location of some of the insulating spacer ridges and columns formed on the backplane.

As very schematically shown in FIG. 8, the spacers 25 are in the form of columns of generally square cross-section (3 microns by 3 microns), integral with the backplane 3, and are evenly distributed over the pixel array, one for each pixel 27. They are supplemented by spaces 26 evenly distributed in the glue lanes 21, 22 between the pixel array and an outer area 22a for the control circuitry (FIG. 3) which is coupled to the array.

The spacers in the glue lanes are in the form of ridges, equal in height to columns 25, but of more elongate form (10 by 100 microns). The insulating pillars and ridges, which are formed simultaneously using the same processing steps, and which extend above the topology of the rest of the backplane, ensure a constant and accurate spacing between the front electrode 6 and the silicon substrate of the backplane 3, to prevent short circuits between the backplane and the front electrode, and to provide electrical and optical uniformity and behavior in the liquid crystal pixel array.

In this embodiment, the spacers comprise at least two layers essentially of the same material and occurring in the same order as is found in at least one of the electrical or electronic elements or the active backplane, for example the transistors. Preferably, all the layers in the spacers correspond in material and order to those found in the transistor(s).

It should be understood that although the embodiment is described in relation to a smectic liquid crystal cell, this invention in its first aspect relates to any cell construction comprising two spaced opposed substrates, and the invention in its second aspect relates to any active backplane intended for use in making such a cell construction.

What is claimed is:

1. A semiconductor backplane comprising:

spaced first and second regions, an array of electronic or electrical elements in said first region, logic elements for addressing said array in said second region, and conductors coupling said first and second regions, wherein the first and second regions are spaced by at least 500 microns to permit the presence of an adhesive sealing strip therebetween without substantial contact with the first and second regions.

2. A backplane according to claim 1 wherein the backplane is an active backplane in which the array comprises active electronic elements.

3. A backplane according to claim 1 and comprising integral spacers distributed within said array.

4. A backplane according to claim 1 and comprising integral spacers distributed within said lane.

5. A backplane according to claim 4 wherein said integral spacers comprise at least two layers essentially of the same material and occurring in the same order as is found in at least one of the electrical or electronic elements of the backplane.

6. A backplane according to claim 5 wherein all the layers in the spacers correspond in material and order to those found in the said at least one electrical or electronic element.

7. A backplane according to claim 1 wherein said at least one electrical or electronic elements is a transistor.

8. A cell comprising a backplane as defined in claim 1, and an opposed electrode sealed thereto in spaced relation.

9. A cell according to claim 8 wherein liquid crystal material is located between the electrode and the backplane.

10. A cell according to claim 9 wherein the liquid crystal material has a smectic phase.

11. A cell according to claim 8 wherein at least one of said backplane and said opposed electrode is transparent or translucent.

12. A cell according to claim 8 wherein the backplane and opposed electrode have identical length and width, and are in complete register.

13. A cell according to claim 8 wherein at least one of the backplane and opposed electrode projects beyond the other on at least one edge thereof.

14. A cell according to claim 13 wherein only the backplane projects beyond the opposed electrode.

15. A method according to claim 13 wherein the backplane projects beyond the opposed electrode on two opposed edges.

* * * * *